United States Patent [19]

Mayo et al.

[11] Patent Number: 5,407,766
[45] Date of Patent: Apr. 18, 1995

[54] HYDROXYGALLIUM PHTHALOCYANINE PHOTOCONDUCTIVE IMAGING MEMBERS

[75] Inventors: James D. Mayo, Toronto; James M. Duff; Cheng K. Hsiao, both of Mississauga; Sandra J. Gardner, Willowdale; Barkev Keoshkerian, Thornhill, all of Canada

[73] Assignee: Xerox Corporation, Stamford, Conn.

[21] Appl. No.: 169,900

[22] Filed: Dec. 20, 1993

[51] Int. Cl.⁶ .............................................. G03G 5/06
[52] U.S. Cl. ...................................... 430/58; 430/59; 430/78
[58] Field of Search ............................. 430/58, 59, 78

[56] References Cited

U.S. PATENT DOCUMENTS

| | | | |
|---|---|---|---|
| 4,557,989 | 12/1985 | Branston et al. | 430/78 X |
| 5,166,339 | 11/1992 | Duff et al. | 540/141 |
| 5,189,155 | 2/1993 | Mayo et al. | 540/141 |
| 5,189,156 | 2/1993 | Mayo et al. | 540/141 |
| 5,302,479 | 4/1994 | Daimon et al. | 430/78 |

FOREIGN PATENT DOCUMENTS 1221459 9/1989 Japan.
2255980 11/1992 United Kingdom ................. 430/78

OTHER PUBLICATIONS

Bull. Sec. Chim. Fr., 23 (1962) by Denise Colaitis, "No. 2–Study of Some Phthalocyanine Derivatives, Discussion on the Various Routes of Preparation, I-Phthalocyanines with Elements of Valence Greater Than Two".

*Primary Examiner*—Roland Martin
*Attorney, Agent, or Firm*—E. O. Palazzo

[57] ABSTRACT

A process for the preparation of hydroxygallium phthalocyanine and elements containing same which comprises the synthesis of a precursor halogallium phthalocyanine by the reaction of a diiminoisoindolene with gallium acetylacetonate; hydrolysis thereof to hydroxygallium phthalocyanine; and conversion of the resulting hydroxygallium phthalocyanine obtained to Type V hydroxygallium phthalocyanine by contacting said resulting hydroxygallium phthalocyanine with an organic solvent.

6 Claims, 11 Drawing Sheets

HYDROXYGALLIUM PHTHALOCYANINE PHOTOCONDUCTIVE IMAGING MEMBERS

BACKGROUND OF THE INVENTION

This invention is generally directed to hydroxy gallium phthalocyanines and photoconductive imaging members thereof, and, more specifically, the present invention is directed to processes for the preparation of hydroxygallium phthalocyanines wherein there is avoided the use of a halo, especially a chloro component, such as chlorogallium phthalocyanine. In embodiments, the process of the present invention comprises the preparation of Type V hydroxygallium phthalocyanine which comprises the formation of a precursor gallium phthalocyanine with, for example, an X-ray powder diffraction trace having peaks at Bragg angles of 7.6, 8.1, 9.7, 16.0, 18.4, 19.2, 19.9, 24.7, 25.7 and 26.2, and the highest peak at 8.1 degrees 2Θ, prepared by reaction of 1,3-diiminoisoindolene with gallium acetylacetonate in a suitable solvent, such as N-methylpyrrolidone, or halonaphthalene like 1-chloronaphthalene, quinoline, and the like; hydrolyzing the precursor by dissolving in a strong acid and then reprecipitating the resulting dissolved pigment in aqueous ammonia, thereby forming Type I hydroxygallium phthalocyanine; and admixing the Type I formed with a polar aprotic organic solvent, for example N,N-dimethylformamide N-methyl pyrrolidone, pyridine, dimethylsulfoxide, and the like. More specifically, in embodiments the process of the present invention comprises the formation of a precursor prepared by the reaction of 1 part of gallium acetylacetonate with from about 1 part to about 10 parts, and preferably about 4 parts of 1,3-diiminoisoindolene in a solvent, such as quinoline, chloronaphthalene, or N-methylpyrrolidone, in an amount of from about 10 parts to about 100 parts and preferably about 19 parts for each part of gallium acetylacetonate that is used to provide a pigment precursor gallium phthalocyanine, which is subsequently washed with a component such as dimethylformamide to provide the precursor gallium phthalocyanine as determined by X-ray powder diffraction with an X-ray powder diffraction trace having peaks at Bragg angles of 7.6, 8.1, 9.7, 16.0, 18.4, 19.2, 19.9, 24.7, 25.7, and 26.2, and the highest peak at 8.1 degrees 2Θ; dissolving 1 weight part of the resulting gallium phthalocyanine in concentrated, about 94 percent, sulfuric acid in an amount of from about 1 weight part to about 100 weight parts and in an embodiment, about 5 weight parts, by stirring the pigment precursor gallium phthalocyanine in the acid for an effective period of time, from about 30 seconds to about 24 hours, and in an embodiment, about 2 hours at a temperature of from about 0° C. to about 75° C., and preferably about 40° C. in air or under an inert atmosphere such as argon or nitrogen; adding the resulting mixture to a stirred organic solvent, in a dropwise manner at a rate of about 0.5 milliliter per minute to about 10 milliliters per minute and in an embodiment, about 1 milliliter per minute to a nonsolvent, which can be a mixture comprised of from about 1 volume part to about 10 volume parts and preferably about 4 volume parts of concentrated aqueous ammonia solution (14.8N) and from about 1 volume part to about 10 volume parts, and preferably about 7 volume parts of water for each volume part of sulfuric acid that was used, which solvent mixture was chilled to a temperature of from about −25° C. to about 10° C. and in an embodiment, about −5° C. while being stirred at a rate sufficient to create a vortex extending to the bottom of the flask containing said solvent mixture; isolating the resulting blue pigment by, for example, filtration; and washing the hydroxygallium phthalocyanine product obtained with deionized water by redispersing and filtering from portions of deionized water, which portions are from about 10 volume parts to about 400 volume parts and in an embodiment, about 200 volume parts for each weight part of precursor pigment gallium phthalocyanine which was used. The product, a dark blue solid, was confirmed to be Type I hydroxygallium phthalocyanine on the basis of its X-ray diffraction pattern having major peaks at 6.9, 13.1, 16.4, 21.0, 26.4, and the highest peak at 6.9 degrees 2Θ. The Type I hydroxygallium phthalocyanine product so obtained can then be treated with a solvent, such as N,N,-dimethylformamide, by, for example, ball milling said Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours, such that there is obtained a hydroxygallium phthalocyanine Type V, in a purity of up to about 99.5 percent.

Advantages of the present invention include the use of an air stable reagent, gallium acetylacetonate, used in the reaction in place of the highly reactive component gallium chloride, and the generation of a pigment precursor gallium phthalocyanine with an X-ray powder diffraction trace having peaks at Bragg angles of 7.6, 8.1, 9.7, 16.0, 18.4, 19.2, 19.9, 24.7, 25.7, and 26.2, and the highest peak at 8.1 degrees 2Θ, which when converted to product hydroxygallium phthalocyanine Type V, by the processes described in Examples VI and VII, is free of chlorine as opposed to the process described in Example V, whereby there is generated a pigment precursor chlorogallium phthalocyanine with an X-ray powder diffraction trace having peaks at Bragg angles of 9.1, 11.0, 18.8, 20.3, and 27.0, and the highest peak at 27.0 degrees 2 Θ, which, when converted to product hydroxygallium phthalocyanine Type V, by the processes described in Examples VI and VII, has residual chlorine levels of, for example, 0.68 percent. It is believed that impurities, such as chlorine, in the photogenerating Type V hydroxygallium phthalocyanine can cause a reduction in the xerographic performance thereof, and in particular, increased levels of dark decay, and such impurities have a negative adverse impact on the cycling performance of the photoreceptor device.

The Type V obtained can be selected as organic photogenerator pigments in layered photoresponsive imaging members with charge transport layers, especially hole transport layers containing hole transport molecules such as known tertiary aryl amines. The aforementioned photoresponsive, or photoconductive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible using toner compositions of appropriate charge polarity. In general, the imaging members are sensitive in the wavelength region of from about 550 to about 900 nanometers, and in particular, from 700 to about 850 nanometers, thus diode lasers can be selected as the light source.

In *Bull. Soc. Chim. Fr.*, 23 (1962), there is illustrated the preparation of hydroxygallium phthalocyanine via the precursor chlorogallium phthalocyanine. The precursor chlorogallium phthalocyanine is prepared by reaction of o-cyanobenzamide with gallium chloride in the absence of solvent. O-cyanobenzamide is heated to its melting point (172° C.), and to it is added gallium chloride at which time the temperature is increased to 210° C. for 15 minutes, and then cooled. The solid is recrystallized out of boiling chloronaphthalene, to give purple crystals having carbon, hydrogen and chlorine analyses matching theoretical values for chlorogallium phthalocyanine. Dissolution in concentrated sulfuric acid, followed by reprecipitation in diluted aqueous ammonia, affords material having carbon, and hydrogen analyses matching theoretical values for hydroxygallium phthalocyanine.

In JPLO 221459, there are illustrated gallium phthalocyanine compounds which show the following intense diffraction peaks at Bragg angles (2 theta ±0.2°) in the X-ray diffraction spectrum,
1. 6.7, 15.2, 20.5, 27.0;
2. 6.7, 13.7, 16.3, 20.9, 26.3 (hydroxygallium phthalocyanine Type I); and
3. 7.5, 9.5, 11.0, 13.5, 19.1, 20.3, 21.8, 25.8, 27.1, 33.0 (chlorogallium phthalocyanine Type I).

Further, there is illustrated in JPLO 221459 a photoreceptor for use in electrophotography comprising a charge generation material and charge transport material on a conductive substrate, and the charge generation material comprising one or a mixture of two or more of gallium phthalocyanine compounds which show the following intense diffraction peaks at Bragg angles (2 theta ±0.2°) in the X-ray diffraction spectrum,
1. 6.7, 15.2, 20.5, 27.0;
2. 6.7, 13.7, 16.3, 20.9, 26.3; and
3. 7.5, 9.5, 11.0, 13.5, 19.1, 20.3, 21.8, 25.8, 27.1, 33.0.

In Konica Japanese 64-17066/89, there is disclosed, for example, the use of a new crystal modification of titanyl phthalocyanine (TiOPc) prepared from alpha-type TiOPc (Type II) by milling it in a sand mill with salt and polyethylene glycol. This publication also discloses that this new polymorph differs from alpha-type pigment in its light absorption and shows a maximum absorbance at 817 nanometers while the alpha-type exhibits a maximum at 830 nanometers. The Konica publication also discloses the use of this new form of TiOPc in a layered electrophotographic device having high photosensitivity at exposure radiation of 780 nanometers. Further, this new polymorph of TiOPc is also described in U.S. Pat. No. 4,898,799 and in a paper presented at the Annual Conference of Japan Hardcopy in July 1989. In this paper, this same new polymorph is referred to as Type Y, and reference is also made to Types I, II, and III as A, B, and C, respectively.

Layered photoresponsive imaging members have been described in a number of U.S. patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The use of certain perylene pigments as photoconductive substances is also known. There is thus described in Hoechst European Patent Publication 0040402, DE3019326, filed May 21, 1980, the use of N,N'-disubstituted perylene-3,4,9,10-tetracarboxyldiimide pigments as photoconductive substances. Specifically, there is, for example, disclosed in this publication N,N'-bis(3-methoxypropyl)perylene-3,4,9, 10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there are specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

In copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance with low dark decay characteristics and high photosensitivity, particularly in comparison to several prior art imaging members prepared by solution coating or spray coating, reference for example U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal-free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339 (D/90198), the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I, or β-type titanyl phthalocyanine as determined by X-ray powder diffraction analysis; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120 to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

Disclosed in U.S. Pat. No. 5,164,493 (D/90524) is a process for the preparation of titanyl phthalocyanine Type I which comprises the addition of titanium tetraalkoxide in a solvent to a mixture of phthalonitrile and a diiminoisoindolene, followed by heating. The disclosure of this application is totally incorporated herein by reference. Disclosed in U.S. Pat. No. 5,189,156 (D/91152) is a process for the preparation of titanyl phthalocyanine Type I which comprises the reaction of titanium tetraalkoxide and diiminoisoindolene in the presence of a halonaphthalene solvent; and U.S. Pat. No. 5,206,359 (D/91151) is a process for the preparation of titanyl phthalocyanine which comprises the treatment of titanyl phthalocyanine Type X with a halobenzene, the disclosures of which are totally incorporated herein by reference.

Illustrated in copending patent application U.S. Ser. No. 105,264 (D/93101), the disclosure of which is totally incorporated herein by reference, are processes for the preparation of Type II dihydroxygermanium phthalocyanine, which comprises the reaction of phthalonitrile or diiminoisoindolene with tetrahalogermanium or tetraalkoxygermanium in a suitable solvent, treatment of the resultant dihalogermanium phthalocyanine or dialkoxygermanium phthalocyanine intermediate with concentrated sulfuric acid, and then water, and filtering and washing of the dihydroxygermanium phthalocyanine precipitate with water using care that the filtrate of the washing does not exceeds a pH of 1.0, removing the absorbed acid on the dihydroxygermanium phthalocyanine product with an organic base, such as amine, and optionally washing the pigment crystals with an aprotic organic solvent, such as an alkylene halide like methylene chloride, tetrahydrofuran, or dimethylformamide; and the preparation of Type II dihydroxygermanium phthalocyanine by polymorphic conversion from other polymorphs, such as Type I polymorph, by simply treating with concentrated sulfuric acid, followed by the same washing processes as described above. The different polymorphic forms of dihydroxygermanium phthalocyanine can be readily identified by various known analytical methods including solid state absorption spectra and X-ray powder diffraction analysis (XRPD).

Also, in U.S. Ser. No. 169,486, the disclosure of which is totally incorporated herein by reference, there is illustrated a process for the preparation of hydroxygallium phthalocyanine Type V, essentially free of chlorine, whereby a pigment precursor Type I chlorogallium phthalocyanine is prepared by reaction of gallium chloride in a solvent such as N-methylpyrrolidone, present in an amount of from about 10 parts to about 100 parts, and preferably about 19 parts, with 1,3-diiminoisoindolene (DI$^3$) in an amount of from about 1 part to about 10 parts, and preferably about 4 parts DI$^3$ for each part of gallium chloride that is reacted; hydrolyzing the pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution, for example from about 10.to about 15 percent; and subsequently treating the resulting hydrolyzed pigment hydroxygallium phthalocyanine Type I with a solvent, such as N,N-dimethylformamide, present in an amount of from about 1 volume part to about 50 volume parts and preferably about 15 volume parts, for each weight part of pigment hydroxygallium phthalocyanine that is used by, for example, ball milling said Type I hydroxygallium phthalocyanine pigment in the presence of spherical glass beads, approximately 1 millimeters to 5 millimeters in diameter at room temperature, about 25° C., for a period of from about 12 hours to about 1 week, and preferably about 24 hours such that there is obtained a hydroxygallium phthalocyanine Type V, ball milling contains very low levels of residual chlorine of from about 0,001 percent to about 0.1 percent, and in an embodiment about 0.03 percent of the weight of the Type V hydroxygallium pigment, as determined by elemental analysis.

The disclosures of all of the aforementioned publications, laid open applications, copending applications and patents are totally incorporated herein by reference.

SUMMARY OF THE INVENTION

It is an object of the present invention to provide processes for the preparation of hydroxygallium phthalocyanine and imaging members thereof with many of the advantages illustrated herein.

Another object of the present invention relates to the provision of improved layered photoresponsive imaging members with photosensitivity to near infrared radiations.

It is yet another object of the present invention to provide simple and economical processes for the preparation of Type V hydroxygallium phthalocyanine, wherein the use of chlorine containing reactants can be avoided in the preparation of a precursor pigment and wherein gallium acetylacetonate is selected as the gallium source, rather than, for example, chlorogallium phthalocyanine.

In a further object of the present invention, there are provided processes for the preparation of Type V hydroxygallium phthalocyanine with the XRPD as illustrated in FIG. 1 and with peaks at Bragg angles of 7.4, 9.8, 12.4, 16.2, 17.6, 18.4, 21.9, 23.9, 25.0, 28.1, and the highest peak at 7.4 degrees 2$\Theta$.

In a further object of the present invention, there are provided processes for the preparation of Type V hydroxygallium phthalocyanine wherein the pigment precursor, gallium phthalocyanine, is prepared using a very air stable reagent; gallium acetylacetonate, and the use of gallium chloride, which is very unstable in air, can be avoided; for example, it fumes and hydrolyzes immediately on contact with air.

A further object of the present invention relates to the preparation of electrically pure Type V hydroxygallium phthalocyanine in acceptable yield, exceeding 65 percent from about 40 percent to about 70 percent, and in an embodiment about 65 percent, and wherein halogens, such as chlorine are not contained in the product, which halogens adversely effect the photoconductive characteristics of imaging members with the Type V as a photogenerating pigment.

In still a further object of the present invention there are provided photoresponsive imaging members with an aryl amine hole transport layer, and a photogenerator layer comprised of Type V hydroxygallium phthalocyanine pigment components obtained by the processes illustrated herein.

The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about $-800$ volts. After resting for 0.5 second in the dark, the charged members attained a surface potential of $V_{ddp}$, dark development potential. Each member was then exposed to light from a filtered Xenon lamp with a XBO 150 watt bulb, thereby inducing a photodischarge which resulted in a reduction of surface potential to a $V_{bg}$ value, background potential. The percent of photodischarge was calculated as $100 \times (V_{ddp} - V_{bg})/V_{ddp}$. The desired wavelength and energy of the exposed light was determined by the type of filters placed in front of the lamp. The monochromatic light photosensitivity was determined using a narrow band-pass filter. The photosensitivity of the imaging members is usually provided in terms of the amount of exposure energy in ergs/cm$^2$, designated as $E_{\frac{1}{2}}$, required to achieve 50 percent photodischarge from the dark development potential. The higher the photosensitivity, the smaller is the $E_{\frac{1}{2}}$ value.

These and other objects of the present invention can be accomplished in embodiments thereof by the provision of processes for the preparation of hydroxygallium phthalocyanine, especially the Type V polymorph, and photoresponsive imaging members thereof. More specifically, in embodiments of the present invention there are provided processes for the preparation of Type V hydroxygallium phthalocyanine which comprises preparing a precursor gallium phthalocyanine prepared by the reaction of 1,3-diiminoisoindolene with gallium acetylacetonate in a suitable solvent, such as quinoline, halo, and especially chloronaphthalene, or N-methylpyrrolidone, and the like; hydrolyzing the precursor by dissolving in a strong acid and then reprecipitating the dissolved pigment in, for example, aqueous ammonia, thereby forming Type I hydroxygallium phthalocyanine; and admixing the Type I with a polar aprotic organic solvent, such as N,N-dimethylformamide, by, for example, ball milling for a period of time of from about 5 minutes to about 1 week, and preferably about 24 hours, at room temperature, about 25° C.

Embodiments of the present invention are directed to processes for the preparation of hydroxygallium phthalocyanine Type V, which comprise the reaction of 1 part of gallium acetylacetonate with from about 1 part to about 10 parts and preferably about 4 parts of 1,3-diiminoisoindolene in a solvent, such as quinoline, a halonaphthalene like chloronaphthalene, or N-methylpyrrolidone, in an amount of from about 10 parts to about 100 parts and preferably about 19 parts, for each part of gallium acetylacetonate that is used, to provide a pigment precursor gallium phthalocyanine, which is subsequently washed with a component, such as dimethylformamide, to provide a pure form of the precursor gallium phthalocyanine as determined by X-ray powder diffraction; dissolving 1 weight part of the resulting gallium phthalocyanine in concentrated, about 94 percent, sulfuric acid in an amount of from about 1 weight part to about 100 weight parts and in an embodiment about 5 weight parts by stirring said pigment in said acid for an effective period of time, from about 30 seconds to about 24 hours, and in an embodiment about 2 hours at a temperature of from about 0° C. to about 75° C., and preferably about 40° C., in air or under an inert atmosphere such as argon or nitrogen; adding the resulting mixture to a stirred organic solvent in a dropwise manner at a rate of about 0.5 milliliter per minute to about 10 milliliters per minute and in an embodiment about 1 milliliter per minute to a nonsolvent, which can be a mixture comprised of from about 1 volume part to about 10 volume parts and preferably about 4 volume parts of concentrated aqueous ammonia solution (14.8N) and from about 1 volume part to about 10 volume parts, and preferably about 7 volume parts of water for each volume part of sulfuric acid that was used, which solvent mixture was chilled to a temperature of from about $-25°$ C. to about 10° C. and in an embodiment about $-5°$ C. while being stirred at a rate sufficient to create a vortex extending to the bottom of the flask containing said solvent mixture; isolating the resulting blue pigment by, for example, filtration; and washing the hydroxygallium phthalocyanine product obtained with deionized water by redispersing and filtering from portions of deionized water, which portions are from about 10 volume parts to about 400 volume parts and in an embodiment about 200 volume parts for each weight part of precursor pigment gallium phthalocyanine which was used. The product, a dark blue solid, was confirmed to be Type I hydroxygallium phthalocyanine on the basis of its X-ray diffraction pattern having major peaks at 6.9, 13.1, 16.4, 21.0, 26.4, and the highest peak at 6.9 degrees 2$\Theta$. The Type I hydroxygallium phthalocyanine product obtained can then be treated with a polar aprotic solvent, such as N,N-dimethylformamide, N-methylpyrrolidone, or the like, by for example, ball milling said Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours such that there is obtained a hydroxygallium phthalocyanine Type V in a purity of up to about 99.5 percent.

For the preparation of the precursor gallium phthalocyanine, the process in embodiments comprises the reaction of 1 part of gallium acetylacetonate with from about 1 part to about 10 parts and preferably about 4 parts of $DI^3$ (1,3-diiminoisoindolene) in the presence of N-methyl pyrrolidone solvent in an amount of from about 10 parts to about 100 parts and preferably about 19 parts, whereby there is obtained a crude gallium phthalocyanine, which is subsequently purified, up to about a 99.5 percent purity, by washing with, for example, hot dimethylformamide at a temperature of from about 70° C. to about 150° C., and preferably about 150° C. in an amount of from about 1 to about 10, and preferably about 3 times the volume of the solid being washed.

In embodiments, the process of the present invention comprises 1) the addition of 1 part gallium acetylacetonate to a stirred solvent quinoline present in an amount of from about 10 parts to about 100 parts, and preferably about 19 parts with from about 1 part to about 10 parts and preferably about 4 parts of 1,3-diiminoisoindolene; 2) relatively slow application of heat using an appropriate sized heating mantle at a rate of about 1 degree per minute to about 10 degrees per minute and preferably about 5 degrees per minute until refluxing occurs at a temperature of about 200° C.; 3) continued stirring at said reflux temperature for a period of about ½ hour to about 8 hours and preferably about 4 hours; 4) cooling of the reactants to a temperature of about 130° C. to about 180° C. and preferably about 160° C. by removal of the heat source; 5) filtration of the flask contents through, for example, an M-porosity (10 to 15 μm) sintered glass funnel, which was preheated using a solvent, which is capable of raising the temperature of said funnel to about 150° C., for example, boiling N,N-dimethylformamide in an amount sufficient to completely cover the bottom of the filter funnel so as to prevent blockage of said funnel; 6) washing the resulting purple solid by slurrying said solid in portions of boiling DMF either in the funnel or in a separate vessel in a ratio of about 1 to about 10, and preferably about 3 times the volume of the solid being washed until the hot filtrate became light blue in color; 7) cooling and further washing the solid of impurities by slurrying said solid in portions of N,N-dimethylformamide at room temperature, about 25° C., approximately equivalent to about three times the volume of the solid being washed until the filtrate became light blue in color; 8) washing the solid of impurities by slurrying said solid in portions of an organic solvent, such as methanol, acetone, water and the like, and in an embodiment methanol at room temperature, about 25° C., approximately equivalent to about three times the volume of the solid being washed until the filtrate became light blue in color; 9) oven drying the purple solid in the presence of a vacuum or in air at a temperature of from about 25° C. to about 200° C. and preferably about 70° C. for a period of from about 2 hours to about 48 hours and preferably about 24 hours thereby resulting in the isolation of a shiny purple solid, which was identified as being Type I chlorogallium phthalocyanine by its X-ray powder diffraction trace which illustrated major peaks at 7.6, 8.1, 9.7, 16.0, 18.4, 19.2, 19.9, 24.7, 25.7, and 26.2 with the highest peak at 8.1 degrees 2Θ.

Numerous different layered photoresponsive imaging members with the Type V hydroxygallium phthalocyanine pigment obtained by the processes of the present invention can be fabricated. In embodiments, thus the layered photoresponsive imaging members are comprised of a supporting substrate, a charge transport layer, especially an aryl amine hole transport layer, and situated therebetween a photogenerator layer comprised of the Type V hydroxygallium phthalocyanine photogenerating pigment. Another embodiment of the present invention is directed to positively charged layered photoresponsive imaging members comprised of a supporting substrate, a charge transport layer, especially an aryl amine hole transport layer, and as a top overcoating layer Type V hydroxygallium phthalocyanine pigment obtained with the processes of the present invention. Moreover, there is provided in accordance with the present invention an improved negatively charged photoresponsive imaging member comprised of a supporting substrate, a thin adhesive layer, Type V hydroxygallium phthalocyanine photogenerator obtained by the processes of the present invention dispersed in a polymeric resinous binder, such as poly(vinyl butyral), and as a top layer aryl amine hole transporting molecules dispersed in a polymeric resinous binder such as polycarbonate.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging processes wherein the Type V hydroxygallium phthalocyanine pigment absorbs light of a wavelength of from about 650 to about 900 nanometers, and preferably from about 700 to about 800 nanometers. In these known processes, electrostatic latent images are initially formed on the imaging member followed by development, and thereafter transferring the image to a suitable substrate. Imaging members employing Type V hydroxygallium phthalocyanine photogenerator of the present invention exhibit high photosensitivities, generally with $E_{\frac{1}{2}}$ of about 2.0 ergs/cm$^2$ or less, even when exposed to monochromatic radiation of about 700 to 800 nanometers.

Moreover, the imaging members of the present invention can be selected for electronic printing processes with gallium arsenide light emitting diode (LED) arrays which typically function at wavelengths of from about 660 to about 830 nanometers.

One negatively charged photoresponsive imaging member of the present invention is comprised, in the order indicated, of a supporting substrate, an adhesive layer comprised, for example, of a polyester 49,000 available from Goodyear Chemical, a photogenerator layer comprised of Type V hydroxygallium phthalocyanine obtained with the process of the present invention, optionally dispersed in an inactive polymer binder, and a hole transport layer thereover comprised of N,N'-diphenyl-N,N'-bis(3-methyl phenyl)-1,1'-biphenyl-4,4'-diamine dispersed in a polycarbonate binder, and a positively charged photoresponsive imaging member comprised of a substrate, thereover a charge transport layer comprised of N,N'-diphenyl-N,N'-bis(3-methyl phenyl)-1,1'-biphenyl-4,4'-diamine dispersed in a polycarbonate binder, and a top photogenerator layer comprised of Type V hydroxygallium phthalocyanine obtained with the process of the present invention optionally dispersed in an inactive polymer binder.

BRIEF DESCRIPTION OF THE DRAWINGS

For a better understanding of the present invention and further features thereof, reference is made to the following detailed description of various preferred embodiments wherein.

Figure 1A:
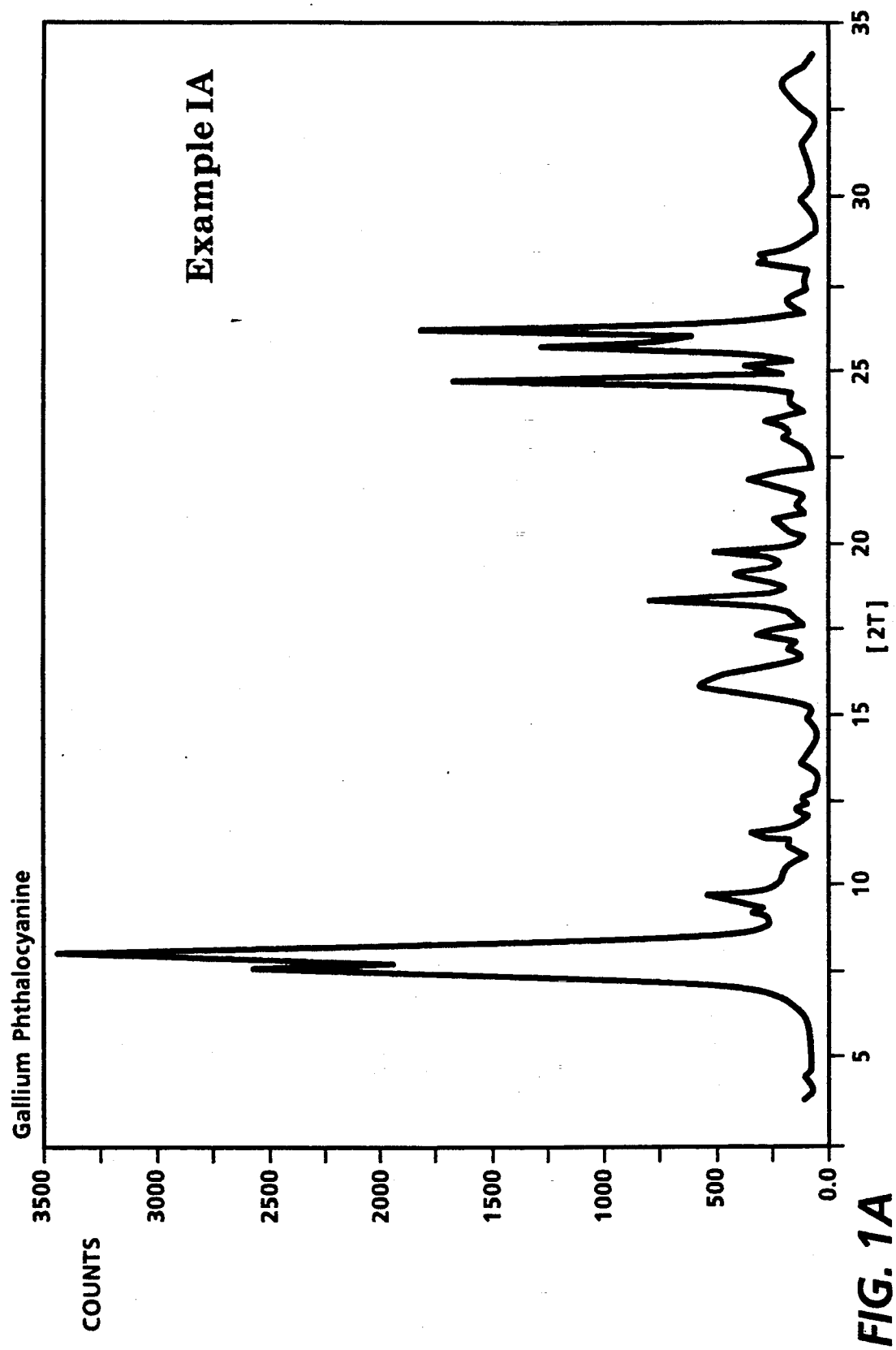
FIG. 1a is an X-ray powder diffraction trace for the pigment precursor gallium phthalocyanine prepared as described in Example Ia.

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of Type V hydroxygallium phthalocyanine obtained with the processes of the present invention dispersed in polymer binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the dihydroxygermanium phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The photogenerator layer can be fabricated by coating a dispersion of Type V hydroxygallium phthalocyanine obtained with the processes of the present invention in a suitable solvent with or without an optional polymer binder material. The dispersion can be prepared by mixing and/or milling the Type V in equipment such as paint shakers, ball mills, sand mills and attritors. Common grinding media such as glass beads, steel balls or ceramic beads may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. In embodiments of the present invention, it is desirable to select a coating solvent that does not disturb or adversely affect the other previously coated layers of the device. Examples of solvents that can be selected for use as coating solvents for the photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate and methoxyethyl acetate, and the like.

The coating of the photogenerator layer in embodiments of the present invention can be accomplished with spray, dip or wire-bar methods such that the final dry thickness of the photogenerator layer is from 0.01 to 30 microns and preferably from 0.1 to 15 microns after being dried at 40° to 150° C. for 5 to 90 minutes.

Illustrative examples of polymeric binder materials that can be selected for the photogenerator pigment include those polymers as disclosed in U.S. Pat. No. 3,121,006, the disclosure of which is totally incorporated herein by reference.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.001 micron to about 1 micron. Optionally, this layer may contain conductive and nonconductive particles, such as zinc oxide, titanium dioxide, silicon nitride, carbon black, and the like to provide, for example, in embodiments of the present invention desirable electrical and optical properties.

Aryl amines selected for the hole transporting layer, which generally is of a thickness of from about 5 microns to about 75 microns, and preferably of a thickness of from about 10 microns to about 40 microns, include molecules of the following formula

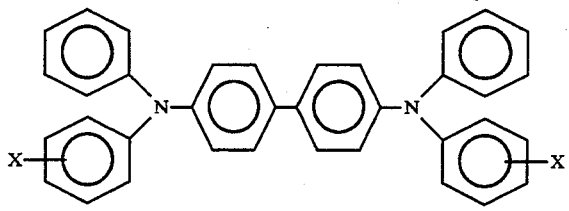

dispersed in a highly insulating and transparent polymer binder, wherein X is an alkyl group or a halogen, especially those substituents selected from the group consisting of Cl and CH$_3$.

Examples of specific aryl amines are N,N'-diphenyl-N,N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)- 1,1'-biphenyl-4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include materials, such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

Specific embodiments of the invention will now be described in detail. These Examples are intended to be illustrative, and the invention is not limited to the materials, conditions, or process parameters set forth in these embodiments. All parts and percentages are by weight unless otherwise indicated.

EXAMPLE Ia

Synthesis of Gallium Phthalocyanine: DI$^3$+Ga(acac)$_3$ in Qn:

A 100 milliliter three-necked flask fitted with mechanical stirrer, condenser and thermometer maintained under an atmosphere of argon was charged with 1,3-diiminoisoindolene (9.7 grams–0.067 mole), gallium acetylacetonate (6.3 grams–0.0172 mole; Strem Chemical) and 50 milliliters of quinoline (BDH). The resulting mixture was heated and stirred at 200° C. for 2 hours. The product gallium phthalocyanine was filtered through a 150 milliliter M-porosity sintered glass funnel which was preheated to approximately 150° C. with boiling DMF, and then washed thoroughly with three portions of 75 milliliters of boiling DMF, followed by three portions of 75 milliliters of DMF at room temperature, and then three portions of 50 milliliters of methanol, thus providing 6.8 grams (66 percent yield) of a blue powder, gallium phthalocyanine, having X-ray diffraction pattern with peaks at Bragg angles of 7.6, 8.1, 9.7, 16.0, 18.4, 19.2, 19.9, 24.7, 25.7, and 26.2, and the highest peak at 8.1 degrees 2Θ for this powder product is shown in FIG. 1a.

EXAMPLE Ib

Figure 1B:
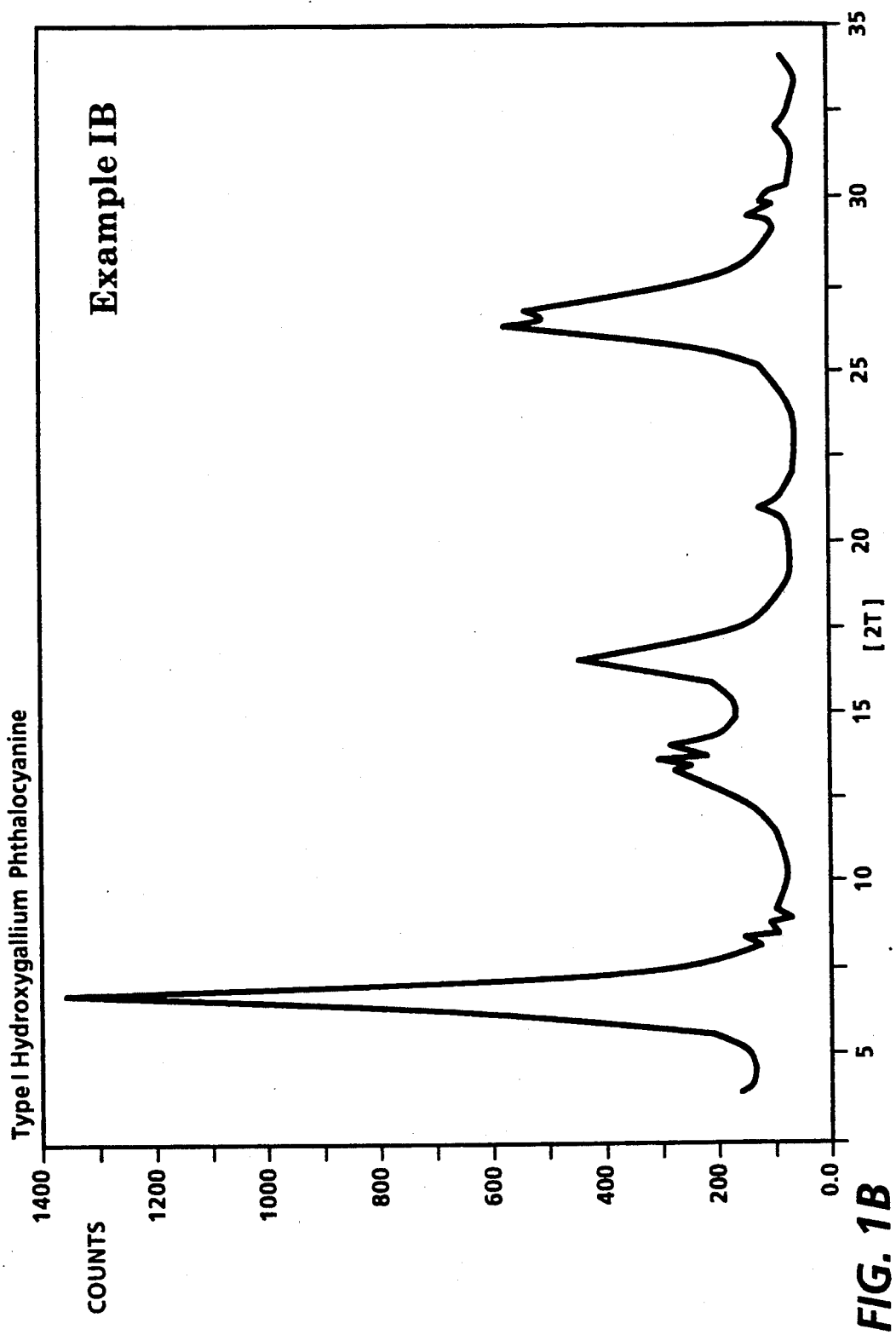
FIG. 1b is an X-ray powder diffraction trace for the pigment intermediate hydroxygallium phthalocyanine Type I prepared as described in Example Ib.

Acid Pasting of the Precursor Pigment (Ia) Gallium Phthalocyanine:

The precursor pigment gallium phthalocyanine, prepared as described in Example Ia above, was then subjected to acid pasting, as follows: Sulfuric acid (125 grams) was heated to 40° C. in a 125 milliliter Erlenmeyer flask. To the heated acid was added 5 grams of the blue solid prepared as described in Example I. Addition of the solid was completed over a 15 minute time period, during which time the temperature of the solution increased to about 47° to 48° C. The resulting acid solution was then stirred for 2 hours at 40° C., at which time it was added in a dropwise fashion to a mixture comprised of concentrated (~33 percent) ammonia (265 milliliters) and deionized water (435 milliliters), which ammonia solution had been cooled to a temperature below 5° C. Addition of the dissolved precursor pigment gallium phthalocyanine was completed over the course of approximately 30 minutes, during which time the temperature of the solution increased to about 35° to 40° C. The reprecipitated pigment, Type I hydroxygallium phthalocyanine, was then removed from the cooling bath, and allowed to stir at room temperature for 1 hour. The solution, which contained the precipitated pigment, Type I hydroxygallium phthalocyanine, was then filtered through a porcelain funnel fitted with a Whatman 934-AH grade glass fiber filter. The resulting blue pigment was redispersed in fresh deionized water by stirring at room temperature for 1 hour, and filtered as before. This process was repeated at least three times until the conductivity of the filtrate was <20 $\mu$S. The filter cake was oven dried overnight at 50° C. to provide 4.75 grams (95 percent) of a dark blue solid. An X-ray diffraction pattern for the solid product identified as Type I hydroxygallium phthalocyanine with peaks at Bragg angles of 6.9, 13.1, 16.4, 21.0, and 26.4, and the highest peak at 6.9 degrees 2$\Theta$ is shown in FIG. 1b.

EXAMPLE Ic

Figure 1C:
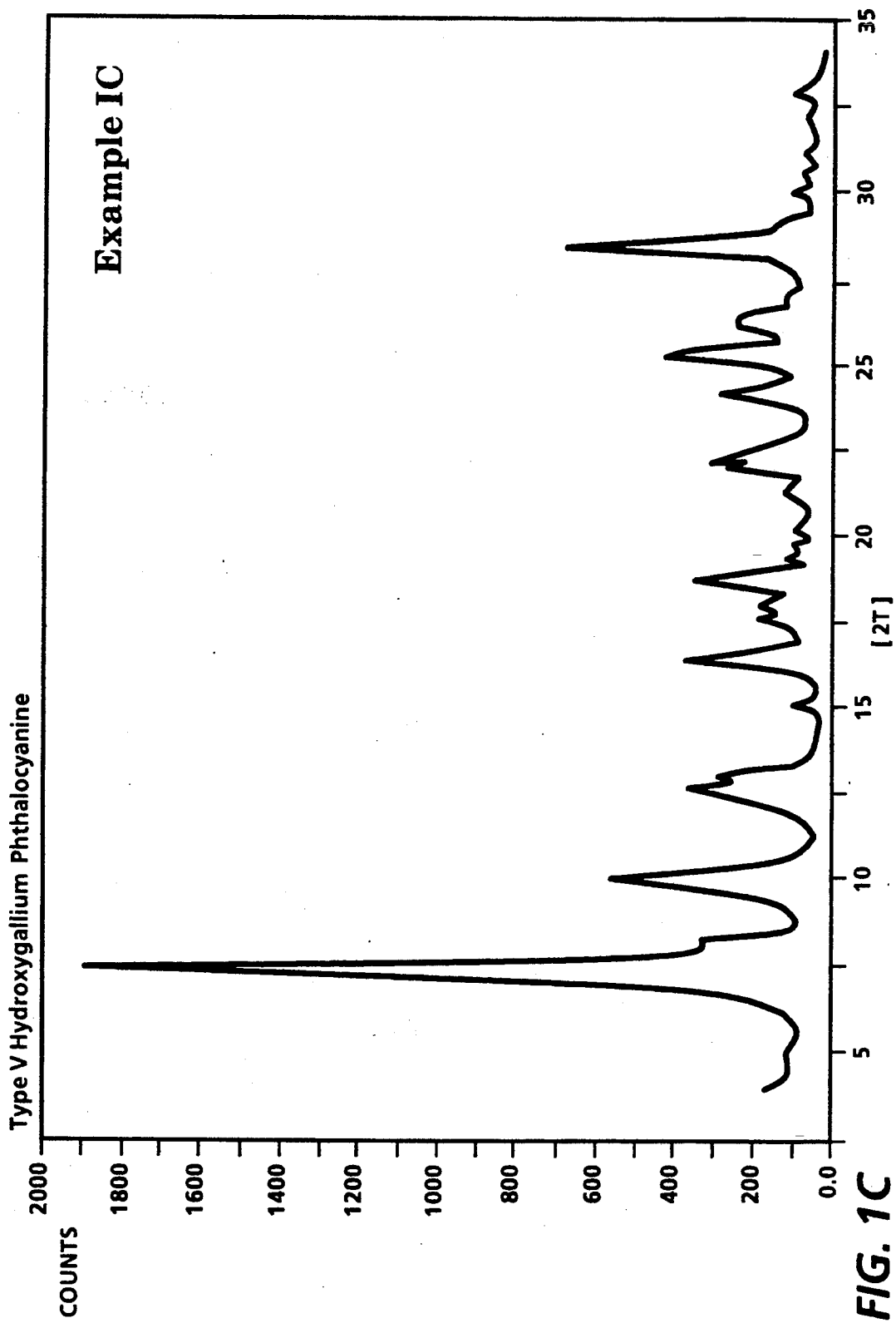
FIG. 1c is an X-ray powder diffraction trace for the photogenerator pigment hydroxygallium phthalocyanine Type V prepared as described in Example Ic.

Polymorphic Conversion of Ib Type I Hydroxygallium Phthalocyanine:

The pigment hydroxygallium phthalocyanine Type I prepared as described in Example Ib (3.0 grams) was added to 45 milliliters of N,N-dimethylformamide (BDH Assured) in a 120 milliliter glass bottle containing 90 grams of glass beads (1 millimeter diameter). The bottle was sealed and placed on a ball mill overnight (16 to 24 hours). The solid was isolated by filtration through a porcelain funnel fitted with a Whatman GF/F grade glass fiber filter, and washed in the filter using five portions of n-butyl acetate (50 milliliters) (BDH Assured). The filter cake was oven dried overnight at 50° C. to give 2.8 grams (93 percent) of a dark blue solid, which was identified as Type V OHGaPc by XRPD. An X-ray diffraction pattern for the solid, Type V hydroxy gallium phthalocyanine, evidenced peaks at Bragg angles of 7.4, 9.8, 12.4, 16.2, 17.6, 18.4, 21.9, 23.9, 25.0, and 28.1, and the highest peak at 7.4 degrees 2$\Theta$ is shown in FIG. 1c.

EXAMPLE IIa

Synthesis of Gallium Phthalocyanine: DI$^3$+Ga(acac)$_3$ in ClNp:

The process of Example Ia was repeated, except that 1-chloronaphthalene was used as a solvent. There resulted 7.8 grams (76 percent) of a dark blue powder, gallium phthalocyanine, with substantially the same XRPD as Example I with peaks at Bragg angles of 7.6, 8.1, 9.7, 16.0, 18.4, 19.2, 19.9, 24.7, 25.7, and 26.2, and the highest peak at 8.1 degrees 2$\Theta$.

EXAMPLE IIb

Acid Pasting of the Precursor Pigment (IIa) Gallium Phthalocyanine:

The pigment, prepared as described in Example IIa, was subjected to acid pasting by the process described in Example Ib to give a blue powder, which was identified by X-ray diffraction analysis as Type I hydroxy gallium phthalocyanine with peaks at Bragg angles of 6.9, 13.1, 16.4, 21.0, and 26.4, and the highest peak at 6.9 degrees 2$\Theta$.

EXAMPLE IIc

Polymorphic Conversion of (IIb) Type I Hydroxygallium Phthalocyanine:

The pigment, prepared as described in Example IIb, was subjected to polymorphic conversion by the process described in Example Ic to provide a blue powder, which was identified by X-ray powder diffraction analysis as Type V hydroxy gallium phthalocyanine with peaks at Bragg angles of 7.4, 9.8, 12.4, 16.2, 17.6, 18.4, 21.9, 23.9, 25.0, and 28.1, and the highest peak at 7.4 degrees 2$\Theta$.

EXAMPLE IIIa

Synthesis of Gallium Phthalocyanine: DI$^3$+Ga(acac)$_3$ in NMP:

The process of Example Ia was repeated, except that N-methylpyrrolidone (Aldrich Chemical) was used as solvent. There resulted 7.7 grams (75 percent) of a dark blue powder, gallium phthalocyanine, with substantially the same XRPD as Example I with peaks at Bragg angles of 7.6, 8.1, 9.7, 16.0, 18.4, 19.2, 19.9, 24.7, 25.7, and 26.2, and the highest peak at 8.1 degrees 2$\Theta$.

EXAMPLE IIIb

Acid Pasting of the Precursor Pigment (IIIa) Gallium Phthalocyanine:

The pigment, prepared as described in Example IIIa, was subjected to acid pasting, by the process described in Example Ib, to provide a blue powder, which was identified by X-ray powder diffraction analysis as Type I hydroxy gallium phthalocyanine with peaks at Bragg angles of 6.9, 13.1, 16.4, 21.0, and 26.4, and the highest peak at 6.9 degrees 2$\Theta$.

EXAMPLE IIIc

Polymorphic Conversion of (IIIb) Type I Hydroxygallium Phthalocyanine:

The pigment, prepared as described in Example IIIb, was subjected to polymorphic conversion, by the process described in Example Ic to give a blue powder, which was identified by X-ray powder diffraction analysis as Type V hydroxy gallium phthalocyanine with peaks at Bragg angles of 7.4, 9.8, 12.4, 16.2, 17.6, 18.4, 21.9, 23.9, 25.0, and 28.1, and the highest peak at 7.4 degrees 2$\Theta$.

EXAMPLE IVa

Figure 2A:
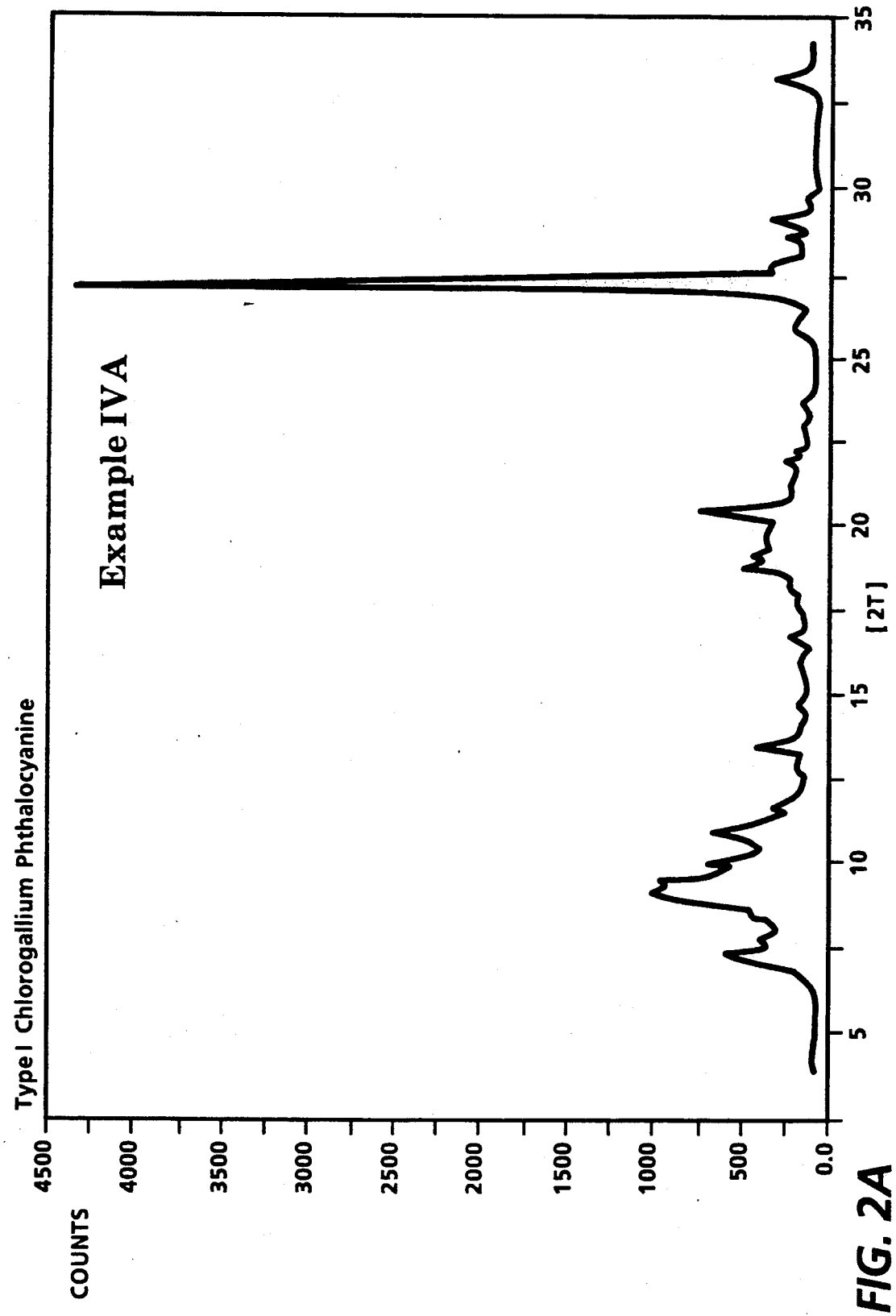
FIG. 2a is an X-ray powder diffraction trace for the pigment precursor chlorogallium phthalocyanine prepared as described in Example IVa.

Synthesis of Type I Chlorogallium Phthalocyanine: (4 DI$^3$/GaCl$_3$/ NMP):

A 250 milliliter three-necked flask fitted with mechanical stirrer, condenser and thermometer maintained under an atmosphere of argon was charged with 1,3-diiminoisoindolene (16 grams–0.11 mole), gallium chloride (5.0 grams–0.0284 mole; Aldrich Chemical) and 50 milliliters of N-methylpyrrolidone (Aldrich Chemical). The mixture was heated and stirred at reflux (202° C.) for 2 hours. The product was cooled to ~150° C., and filtered through a 150 milliliter M-porosity sintered glass funnel, which was preheated to approximately 150° C. with boiling DMF, and then washed thoroughly with three portions of 75 milliliters of boiling DMF, followed by three portions of 75 milliliters of DMF at room temperature, and then three portions of 50 milliliters of methanol, thus providing 7.0 grams (41 percent yield) of a blue powder. X-ray diffraction patterns for this pigment precursor Type I chlorogallium phthalocyanine is shown in FIG. 2a.

EXAMPLE IVb

Figure 2B:
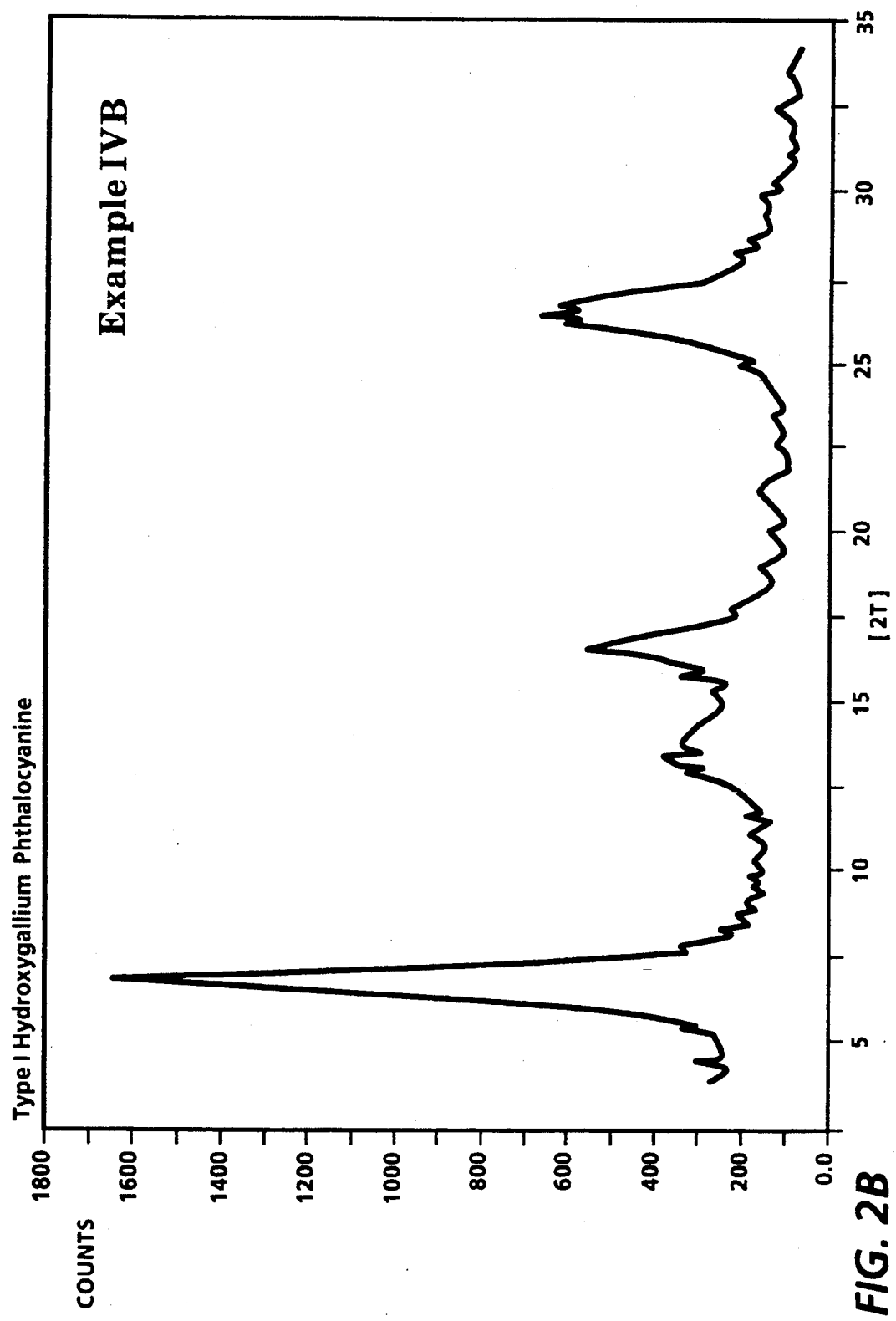
FIG. 2b is an X-ray powder diffraction trace for the pigment intermediate hydroxygallium phthalocyanine Type I prepared as described in Example IVb.

Acid Pasting of the Precursor Pigment (IVa) Chlorogallium Phthalocyanine:

The pigment, prepared as described in Example IVa, was subjected to acid pasting by the process described in Example Ib to provide a blue powder, which was identified by X-ray powder diffraction analysis as Type I hydroxygallium phthalocyanine with peaks at Bragg angles of 6.9, 13.1, 16.4, 21.0, and 26.4, and the highest peak at 6.9 degrees 2Θ, as shown in FIG. 2b.

EXAMPLE IVc

Figure 2C:
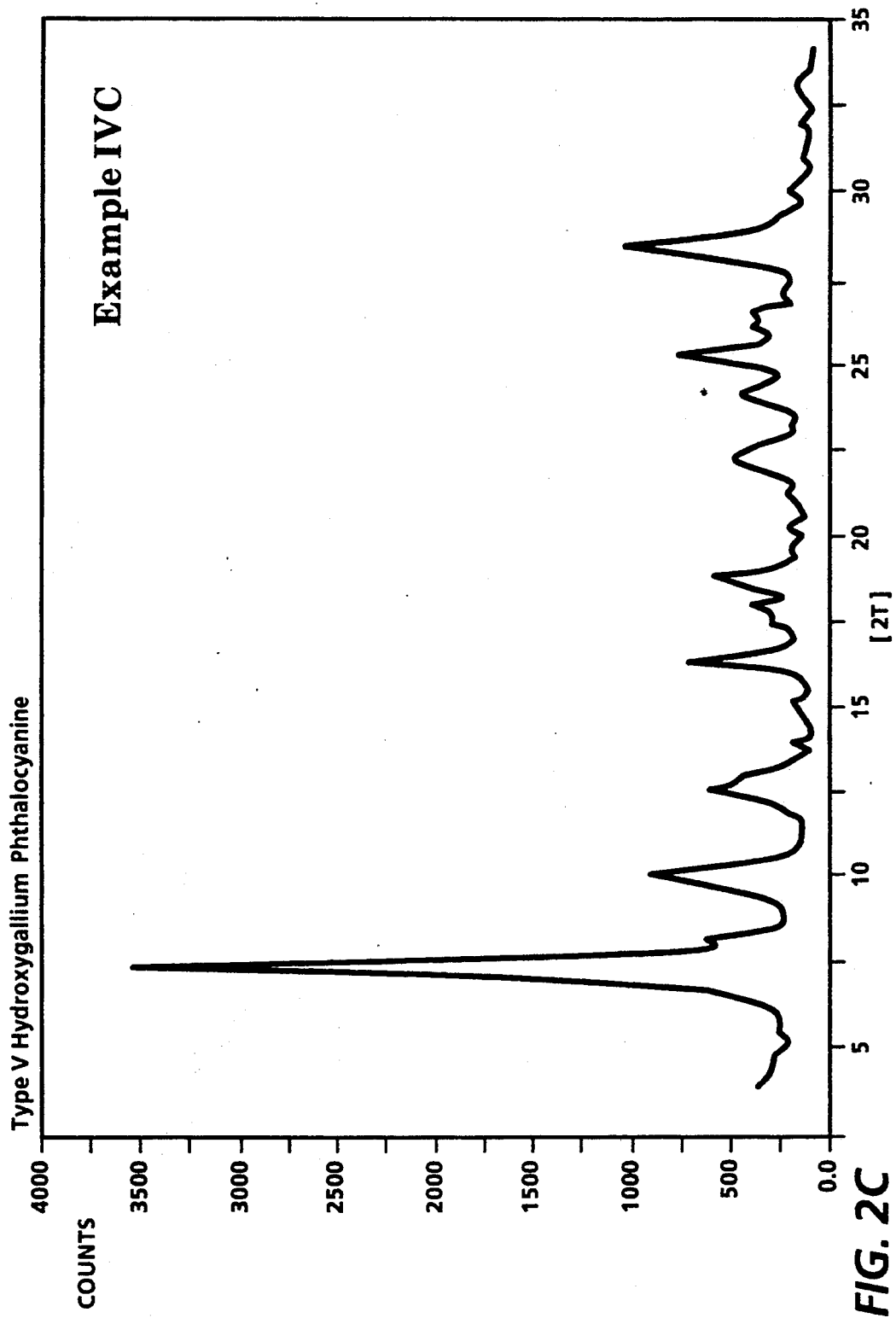
FIG. 2c is an X-ray powder diffraction trace for the photogenerator pigment hydroxygallium phthalocyanine Type V prepared as described in Example IVc.

Polymorphic Conversion of (IVb) Type I Hydroxygallium Phthalocyanine:

The pigment, prepared as described in Example IVb, was subjected to polymorphic conversion by the process described in Example Ic to provide a blue powder, which was identified by X-ray powder diffraction analysis as Type I hydroxy gallium phthalocyanine with peaks at Bragg angles of 7.4, 9.8, 12.4, 16.2, 17.6, 18.4, 21.9, 23.9, 25.0, and 28.1, and the highest peak at 7.4 degrees 2Θ, as shown in FIG. 2c.

EXAMPLE Va

Figure 3A:
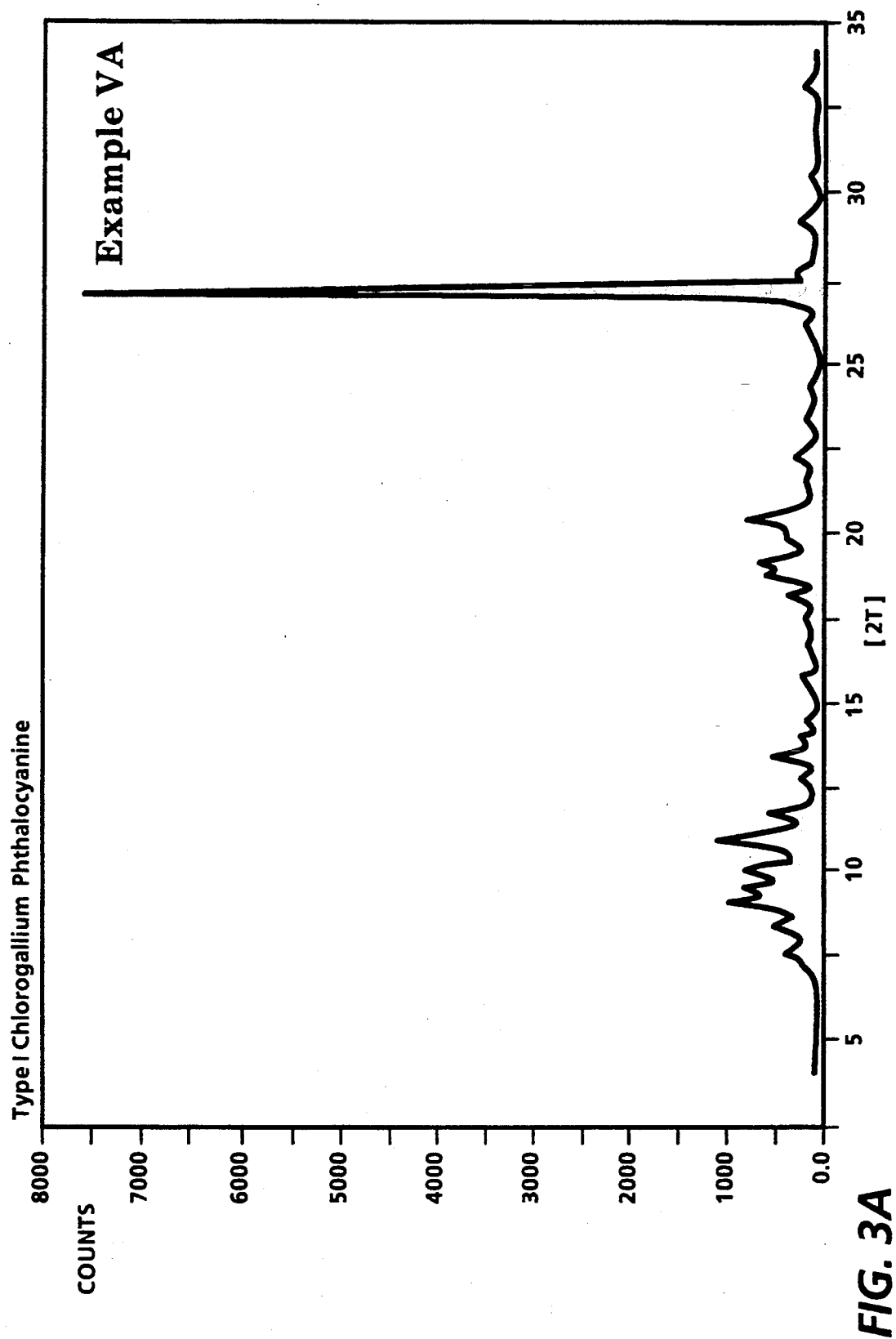
FIG. 3a is an X-ray powder diffraction trace for the pigment precursor chlorogallium phthalocyanine prepared as described in Example Va.

Synthesis of Type I Chlorogallium Phthalocyanine: (4 Pn/GaCl$_3$/ClNp):

A 250 milliliter three-necked flask fitted with mechanical stirrer, condenser and thermometer maintained under an atmosphere of argon was charged with o-phthalonitrile (14.1 grams–0.11 mole; BASF unpurified), gallium chloride (5.0 grams–0.0284 mole; Aldrich Chemical) and 50 milliliters of 1-chloronaphthalene (BDH Chemical). The mixture was heated and stirred at 200° C. for 4 hours. The product was cooled to ~150° C., and filtered through a 150 milliliter M-porosity sintered glass funnel, which was preheated to approximately 150° C. with boiling DMF, and then washed thoroughly with three portions of 75 milliliters of boiling DMF, followed by three portions of 75 milliliters of DMF at room temperature, and then three portions of 50 milliliters of methanol, thus providing 10.4 grams (61 percent yield) of a blue powder. X-ray diffraction patterns for this precursor pigment, chlorogallium phthalocyanine Type I, are shown in FIG. 3a.

EXAMPLE Vb

Figure 3B:
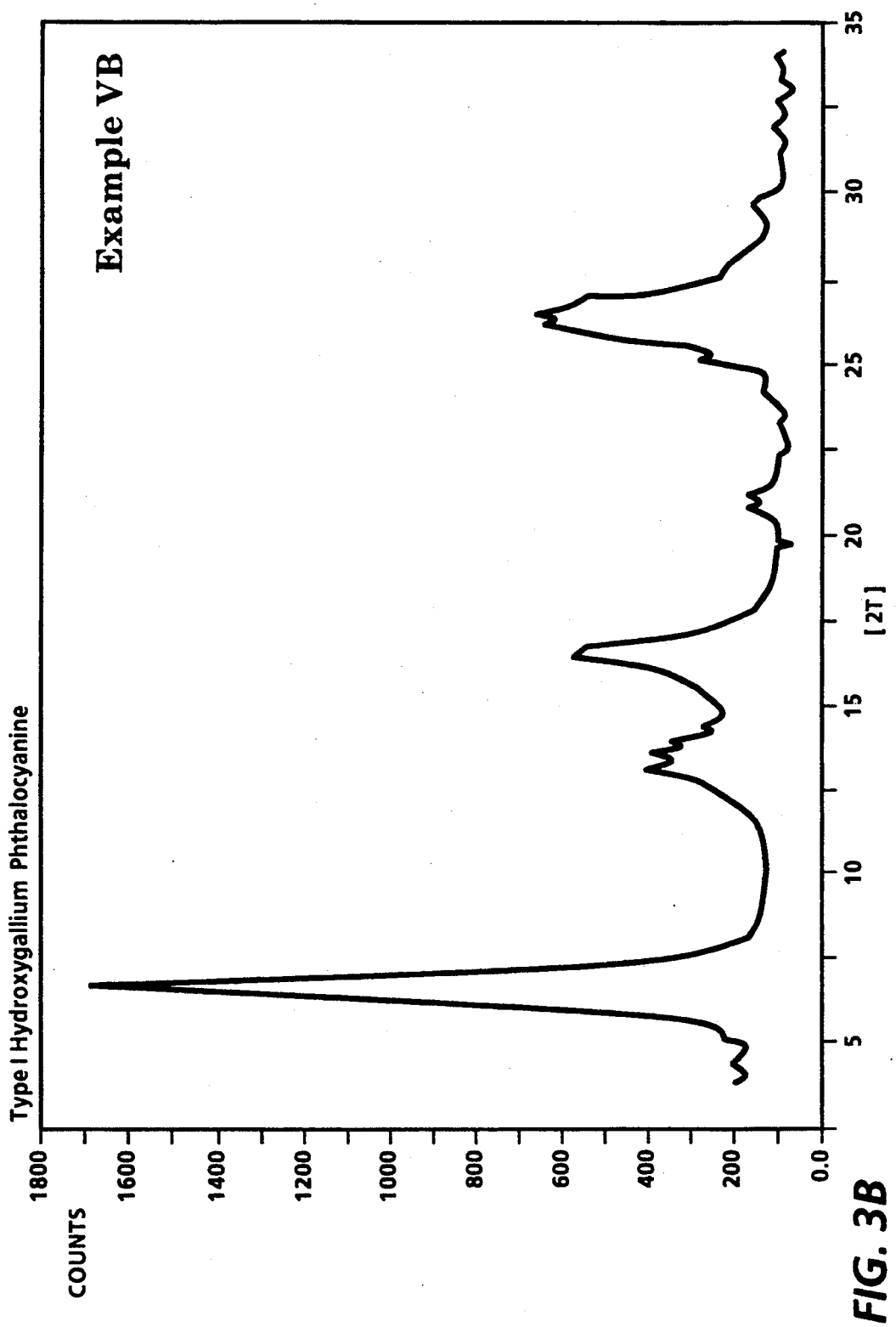
FIG. 3b is an X-ray powder diffraction trace for the pigment intermediate hydroxygallium phthalocyanine Type I prepared as described in Example Vb.

Acid Pasting of the Precursor Pigment (Va.) Chlorogallium Phthalocyanine:

The pigment, prepared as described in Example Va, was subjected to acid pasting by the process described in Example Ib, to provide a blue powder, which was identified by X-ray powder diffraction analysis as Type I hydroxygallium phthalocyanine with peaks at Bragg angles of 6.9, 13.1, 16.4, 21.0, and 26.4, and the highest peak at 6.9 degrees 2Θ as shown in FIG. 3b.

EXAMPLE Vc

Figure 3C:
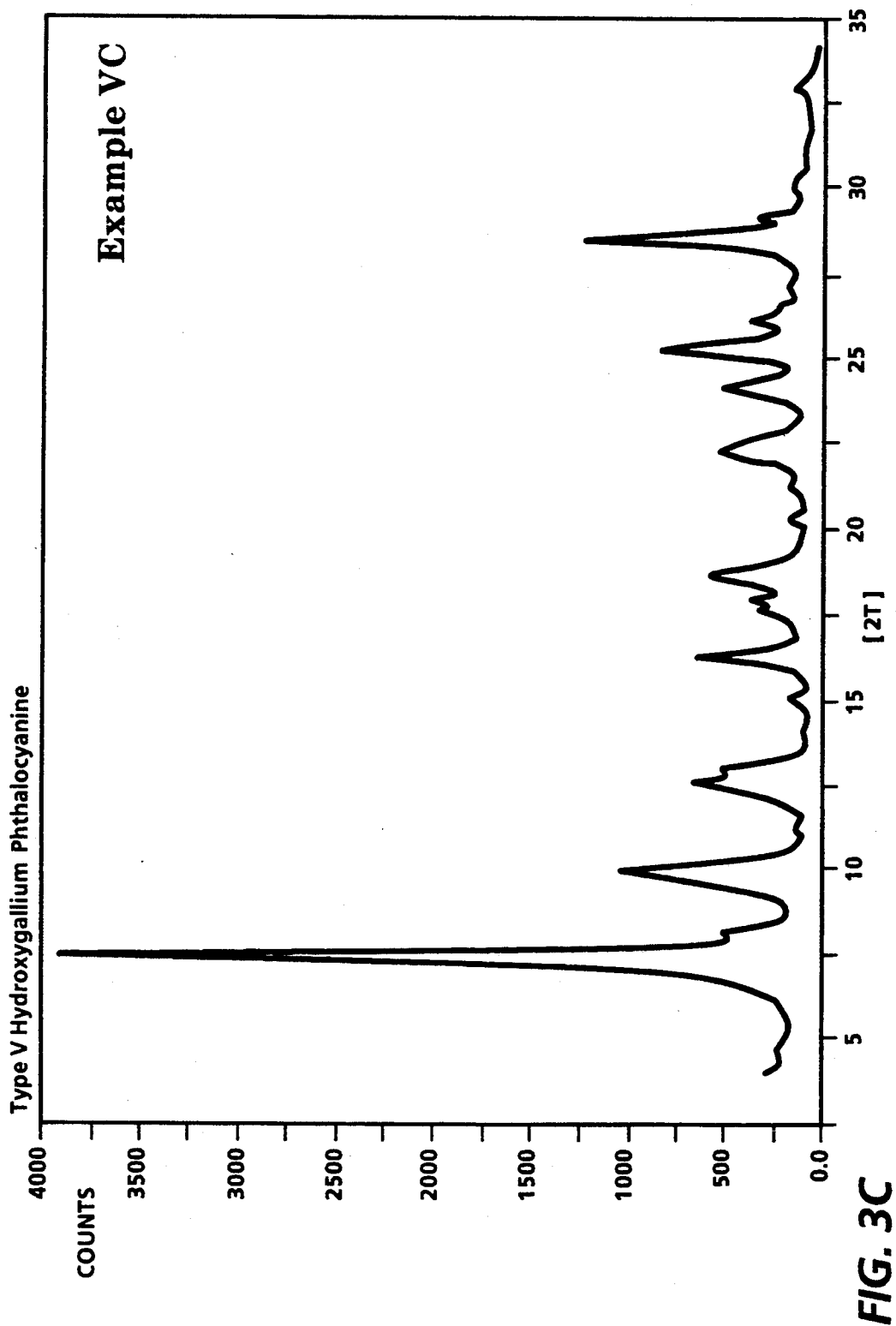
FIG. 3c is an X-ray powder diffraction trace for the photogenerator pigment hydroxygallium phthalocyanine Type V prepared as described in Example Vc.
Figure 4:
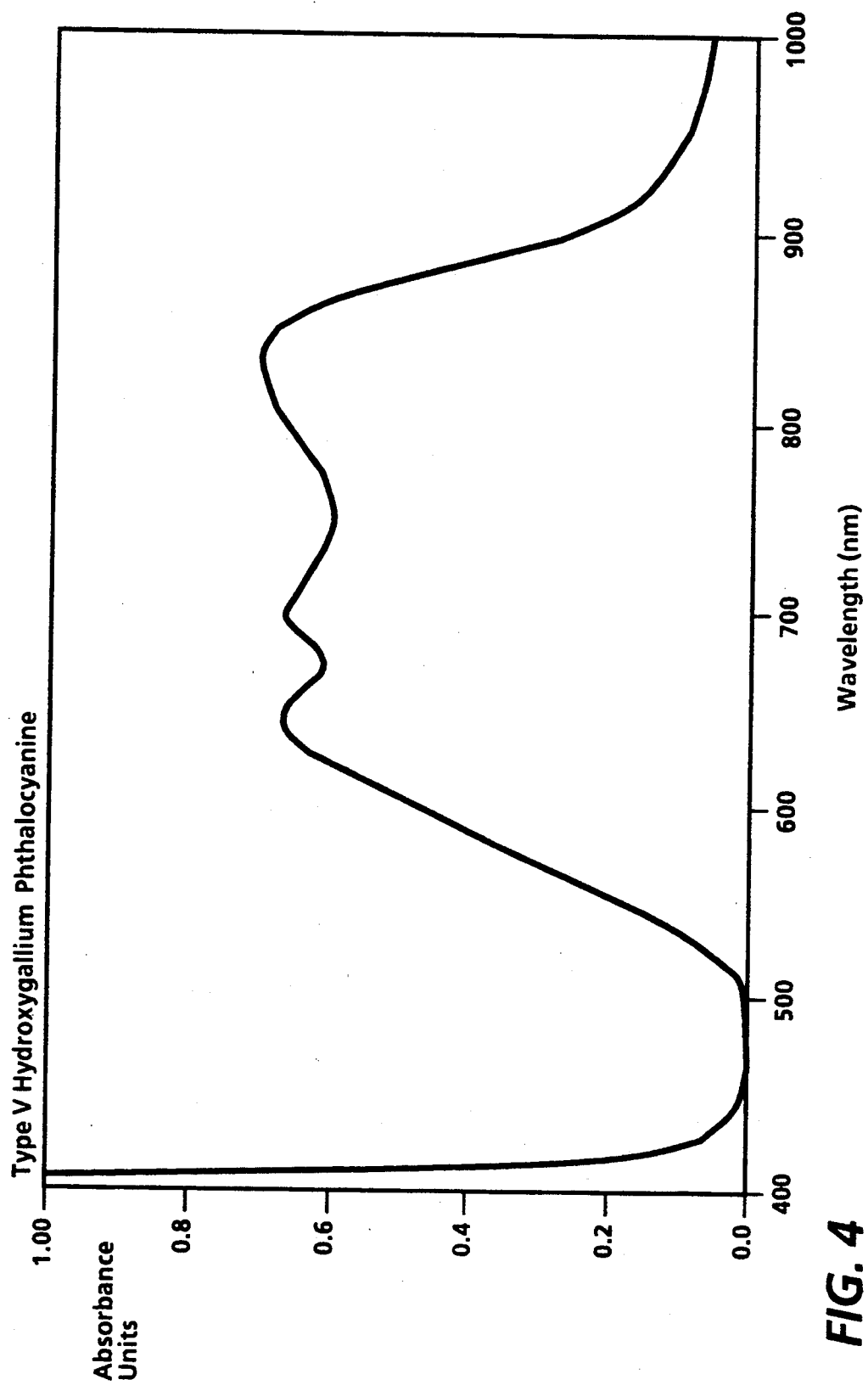
FIG. 4 is the solid state absorption spectrum for Type V hydroxygallium phthalocyanine prepared as described in Example V, for which the pigment precursor, gallium phthalocyanine, was prepared as described in Example I.
Figure 5:
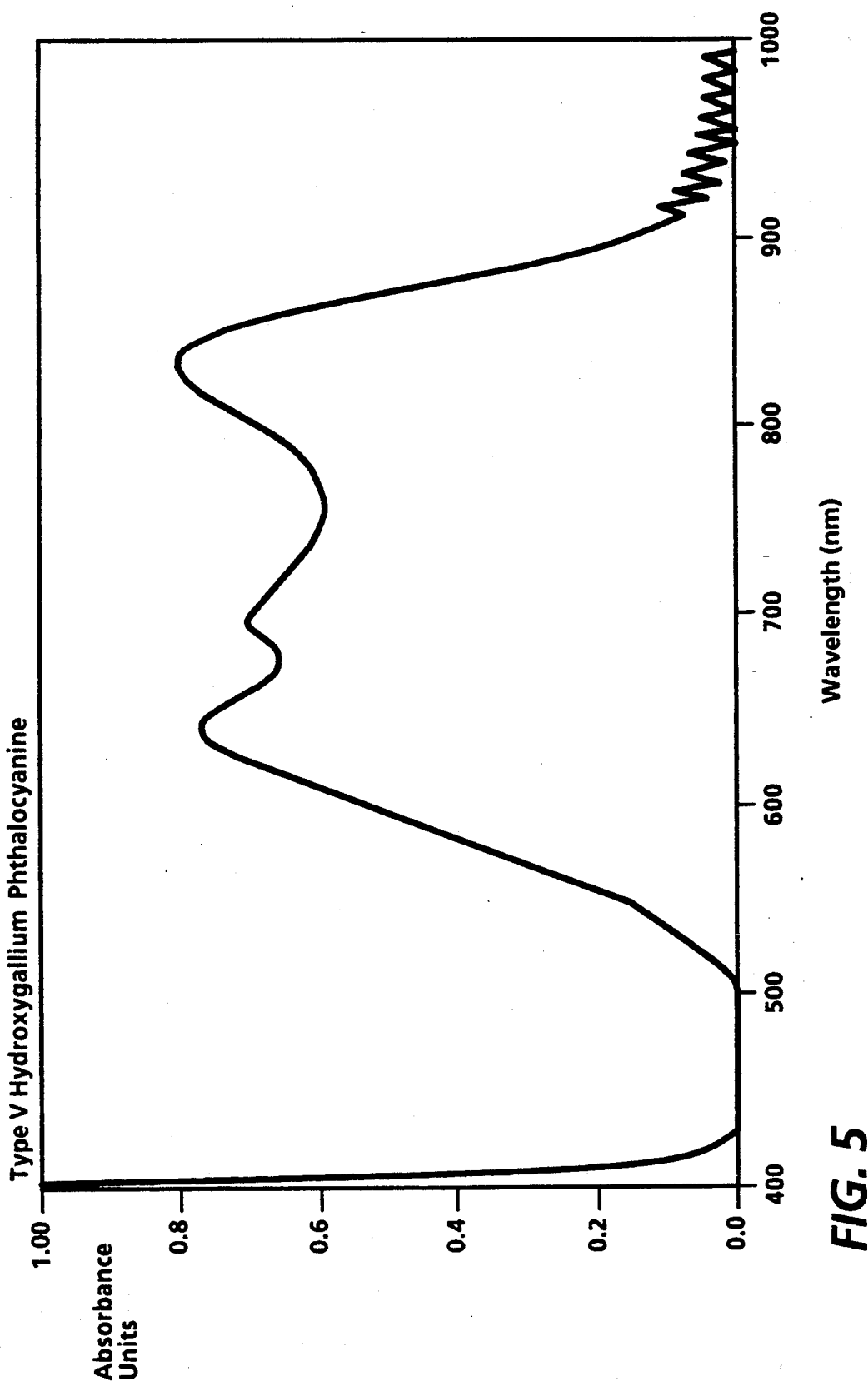
FIG. 5 is the solid state absorption spectrum for Type V hydroxygallium phthalocyanine prepared as described in Example IVc.

Polymorphic Conversion of (Vb) Type I Hydroxygallium Phthalocyanine:

The pigment, prepared as described in Example Vb, was subjected to polymorphic conversion by the process described in Example Ic to provide a blue powder, which was identified by X-ray powder diffraction analysis as Type V hydroxygallium phthalocyanine with peaks at Bragg angles of 7.4, 9.8, 12.4, 16.2, 17.6, 18.4, 21.9, 23.9, 25.0, and 28.1, and the highest peak at 7.4 degrees 2Θ as shown in FIG. 3c.

EXAMPLE VI

The pigment, prepared as described in Example Ib, was subjected to polymorphic conversion by the process described in Example Ic, except that N-methylpyrrolidone was used in place of N,N-dimethylformamide, to provide a blue powder, which was identified by X-ray powder diffraction analysis as Type V hydroxygallium phthalocyanine with peaks at Bragg angles of 7.4, 9.8, 12.4, 16.2, 17.6, 18.4, 21.9, 23.9, 25.0, and 28.1, and the highest peak at 7.4 degrees 2Θ.

EXAMPLE VII

Polymorphic Conversion of (Ib) Type I Hydroxygallium Phthalocyanine:

The pigment, prepared as described in Example Ib, was subjected to polymorphic conversion by the process described in Example Ic, except that pyridine was used in place of N,N-dimethylformamide to provide a blue powder, which was identified by X-ray powder diffraction analysis as Type V hydroxygallium phthalocyanine with peaks at Bragg angles of 7.4, 9.8, 12.4, 16.2, 17.6, 18.4, 21.9, 23.9, 25.0, and 28.1, and the highest peak at 7.4 degrees 2Θ.

EXAMPLE VIII

Polymorphic Conversion of (Ib) Type I Hydroxygallium Phthalocyanine:

The pigment, prepared as described in Example Ib, was subjected to polymorphic conversion by the process described in Example Ic, except that dimethylsulfoxide was used in place of N,N-dimethylformamide to provide a blue powder, which was identified by X-ray powder diffraction analysis as Type V hydroxygallium phthalocyanine with peaks at Bragg angles of 7.4, 9.8, 12.4, 16.2, 17.6, 18.4, 21.9, 23.9, 25.0, and 28.1, and the highest peak at 7.4 degrees 2Θ.

EXAMPLE IX

The hydroxygallium phthalocyanines can be selected as photogenerating layers for layered photoconductive imaging members, including Device 1 of the Table, prepared by the following procedure. An aluminized MYLAR® substrate, about 4 mil in thickness, was coated with a silane/zirconium alkoxide solution prepared by mixing 6.5 grams of acetylacetonate tributoxy zirconium (ZC540), 0.75 gram of (aminopropyl) trimethoxysilane (A1110), 28.5 grams of isopropyl alcohol, and 14.25 grams of butanol using a number 5 wire wound rod applicator. This layer was dried at 140° C. for 20 minutes; the final thickness was measured to be 0.1 micron. A dispersion of hydroxygallium phthalocyanine (HOGaPc) Type V was prepared by combining 0.35 gram of the HOGaPc, prepared as described in Example Ic, and 0.26 gram of poly(vinyl butyral) in 25.21 grams of chlorobenzene in a 60 milliliter glass jar containing 70 grams of 0.8 millimeter glass beads. The dispersion was shaken on a paint shaker for 2 hours then was coated onto the silane/zirconium layer described above using a number 6 wire wound applicator. The formed photogenerating layer HOGaPc Type V was dried at 100° C. for 10 minutes to a final thickness of about 0.20 micron.

A hole transporting layer solution was prepared by dissolving 5.4 grams of N,N'-diphenyl-N,N-bis(3-methyl phenyl)-1,1'-biphenyl-4,4'-diamine, and 8.1 grams of polycarbonate in 61.5 grams of chlorobenzene. The solution was coated onto the HOGaPc Type V generator layer using a 10 mil film applicator. The charge transporting layer thus obtained was dried at 115° C. for 60 minutes to provide a final thickness of about 28 microns.

This imaging member had a dark decay of 20 to 25 volts per second, $E_{\frac{1}{2}}=1.0$ ergs/cm$^2$, a percent discharge of 87.5 percent at an exposure of 5 ergs/cm$^2$, and a percent discharge of 90 percent at an exposure of 10 ergs/cm$^2$.

The xerographic electrical properties of photoresponsive imaging members prepared as described above were determined by electrostatically charging the surface thereof with a corona discharge source until the surface potential, as measured by a capacitatively coupled probe attached to an electrometer, attained an initial dark value, $V_0$, of $-800$ volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100\times(V_{ddp}-V_{bg})/V_{ddp}$. The half exposure energy, that is $E_{\frac{1}{2}}$, which is the amount of exposure energy causing reduction of the $V_{ddp}$ to half of its initial value, was determined. The wavelength of light selected was 780 nanometers.

In Table that follows there is presented information and data for layered imaging members identified as Device numbers 1, 2, 3, and 4, which members were prepared by the process of Example IX, and are comprised of the components illustrated in Examples Ic IIc, IIIc and IVc, respectively, described herein. Devices 1, 2, 3, and 4 are thus comprised of equivalent components for the data presented, except that the hydroxygallium phthalocyanines Type V obtained from the Examples listed, were selected. Qn refers to quinoline, ClNp refers to 1-chloronaphthalene, NMP refers to N-methyl pyrrolidone, Ga(acac)$_3$ refers to gallium acetylacetonate, GaCl3 refers to gallium chloride, Pn refers to o-phthalonitrile, and DI$^3$ refers to 1,3-diiminoisoindolene. In the Table that follows, there are illustrated xerographic electrical characteristics for pigments, specifically hydroxygallium phthalocyanine Type V made by the process of the present invention. As a comparison, Device 4 contains a pigment, hydroxygallium phthalocyanine Type V, made by the process as described in Example IVc. An advantage of the present invention is the lower dark decay values cited.

A further advantage resides in the preparation of hydroxygallium phthalocyanine Type V with no halogens present, such as chlorine, which halogens adversely effect the photoconductive characteristics of imaging members with the Type V as a photogenerating pigment.

TABLE

Xerographic Electrical Evaluations

| REACTION | DARK DECAY (V/s) | % Discharge @ (ergs/cm$^2$) 5 | % Discharge @ (ergs/cm$^2$) 10 | $E_{\frac{1}{2}}$ (ergs/cm$^2$) | COROTRON VOLTAGE (kV) | $V_{ddp}$ (volts) |
|---|---|---|---|---|---|---|
| 4 DI$^3$ + Ga(acac)$_3$ in Qn Device #1 | 20–22 | 87.5 | 90 | 1.0 | −5.52 | −794–813 |
| 4 DI$^3$ + Ga(acac)$_3$ in ClNp Device #2 | 34–37 | 79 | 87 | 1.9 | −5.60 | −793–806 |
| 4 DI$^3$ + Ga(acac)$_3$ in NMP Device #3 | 23–25 | 84 | 89 | 1.2 | −5.52 | −816–824 |
| Pn + GaCl3 in ClNp Device #4 | 34–37 | 89 | 91.5 | 0.7 | −5.68 | −790–813 |

Other embodiments and modifications of the present invention may occur to those skilled in the art subsequent to a review of the information presented herein; these embodiments and modifications, as well as equivalents thereof, are also included within the scope of this invention.

What is claimed is:

1. A layered photoconductive imaging member comprised of a supporting substrate, a photogenerating layer, and a charge transport layer; and wherein the photogenerating layer is comprised of Type V hydroxygallium phthalocyanine obtained by preparing a precursor gallium phthalocyanine by the reaction of 1,3-diiminoisoindolene with gallium acetylacetonate in a solvent of quinoline or n-methylpyrrolidone; filtering and thereafter washing said pigment precursor gallium phthalocyanine with hot N,N-dimethylformamide; followed by washing with an organic solvent; hydrolyzing said precursor by dissolving in a strong acid; and then reprecipitating the resulting dissolved pigment in aqueous ammonia, thereby forming Type I hydroxygallium phthalocyanine; and admixing said Type I with an organic solvent of N,N-dimethylformamide, n-methylpyrrolidone, pyridine, or dimethylsulfoxide.

2. A layered photoconductive imaging member comprised of a supporting substrate, a photogenerating layer, and a charge transport layer; and wherein the photogenerating layer is comprised of Type V hydroxygallium phthalocyanine obtained by the formation of a precursor gallium phthalocyanine prepared by heating one part of gallium acetylacetonate with from about 1 part to about 10 parts of 1,3-diiminoisoindolene in a solvent quinoline or n-methylpyrrolidone present in an amount of from about 10 parts to about 100 parts per part of gallium acetylacetonate that is present; hydrolyzing said precursor by dissolving in a strong acid; and then reprecipitating the dissolved pigment in aqueous ammonia, thereby forming Type I hydroxygallium phthalocyanine; and admixing said Type I hydroxygallium phthalocyanine with an organic solvent of N,N-dimethylformamide, n-methylpyrrolidone, pyridine, or dimethyl sulfoxide.

3. A photoconductive image in accordance with claim 2 wherein the hydroxy gallium type V obtained is free of residual chlorine thereby enabling an imaging member with excellent electrical characteristics.

4. An imaging member in accordance with claim 2 wherein the hydroxy gallium Type V obtained is of a small particle size of from about 0.01 micron to about 0.5 micron.

5. An imaging member in accordance with claim 1 wherein the Type V hydroxy gallium phthalocyanine is free of residual chlorine.

6. A process in accordance with claim 2 wherein the solvent is quinoline and the organic solvent is dimethyl formamide.

* * * * *